3,332,710
FLANGED PIPES WITH LOW CLAMPING STRESS
William Russell Doty, Oakland, Calif., assignor to Chevron Research Company, a corporation of Delaware
Continuation of application Ser. No. 324,294, Nov. 18, 1963. This application Aug. 3, 1966, Ser. No. 570,088
7 Claims. (Cl. 285—336)

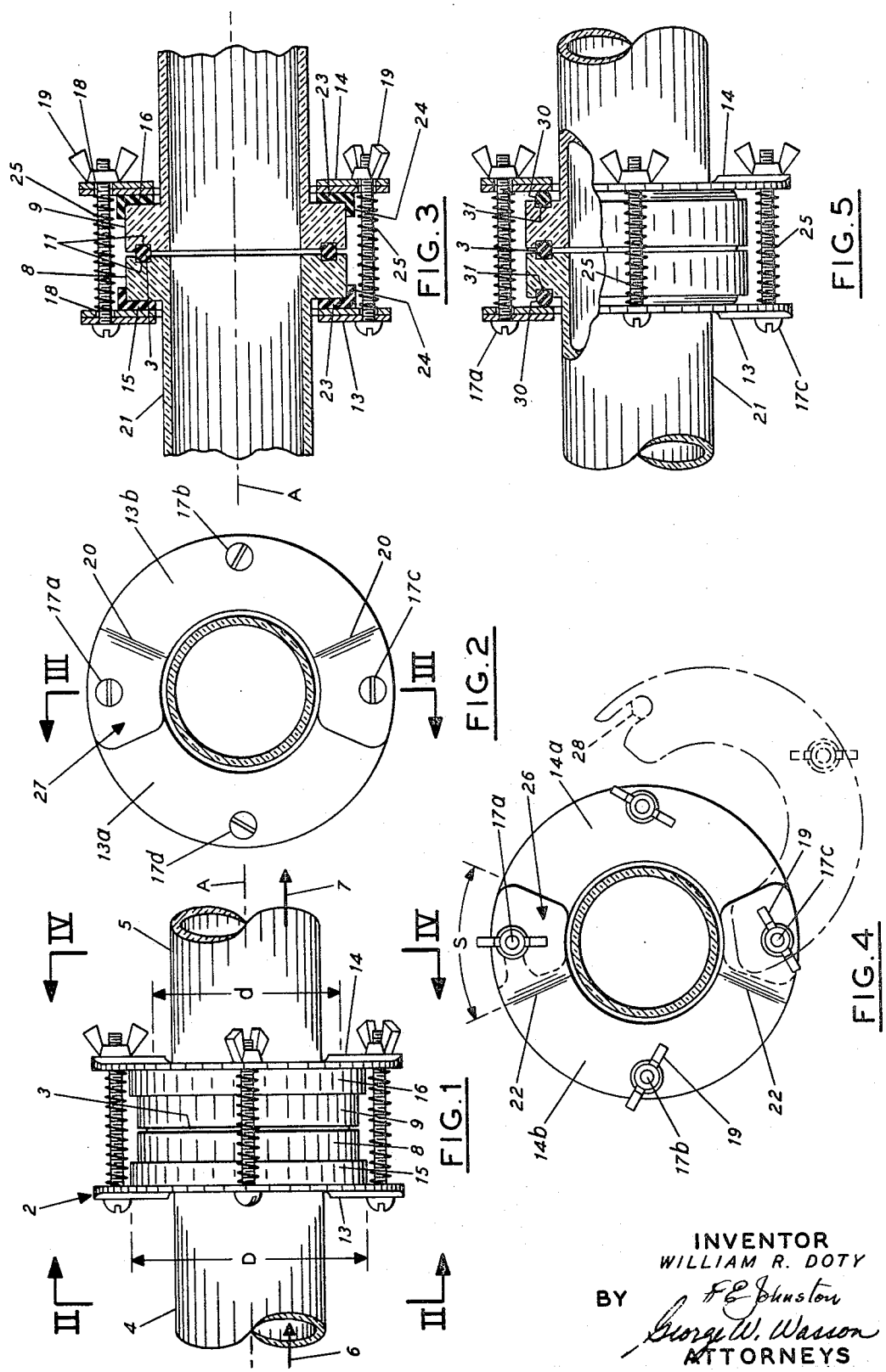

This application is a continuation of Ser. No. 324,294, filed Nov. 18, 1963, and now abandoned.

This invention relates to glassware pipe used in chemical laboratories and more particularly to a fluid-tight joint formed between sections of such pipe.

In my article ("O-ring Seals for Glass Apparatus," Review of Scientific Instruments, volume 30, November 1959, pp. 1053–1054), there is disclosed a joint for sealing flange ends of glass pipe incorporating a resilient O-ring. In the article, it is disclosed that pressure is applied to the ends of the pipe to deform the O-ring by a clamp having two U-shaped support rings connected to the backsides of the flanged ends. In applying pressure to the O-ring, bolts are shown connected near the periphery of the rings to draw the flanged ends of the pipes into contact with the O-ring.

Experience has shown that, owing to the shape of the clamp, the seal at the unsupported segments of the O-ring (between the legs of the U-shaped support rings) is subject to less pressure than is generated at the supported portions. Thus in some instances, for example, as vibration of the piping system occurs, the pressure at these segments may be too small to prevent leakage. On the other hand, if the bolt tension is increased to assure an adequate sealing at all points around the circumference of the O-ring, pressure near the tensioned bolts may bend the flanges beyond their yield point. Furthermore, the flanges incorporated in the joint are often not flat along the surfaces engaging the clamp. Thus, since high spots create stress concentrations that may be greater than the yield point of glass, each surface must be carefully checked before pressure is applied.

It is the object of the present invention to provide a joint incorporating an O-ring packing element designed to form a fluid-tight seal between the flanged ends of a pair of glassware pipe sections where: (1) the joint is assembled and dismantled easily and quickly, (2) the joint is formed in a low cost manner without using lubricating materials of any type, and (3) the bending stresses acting at the ends of the pipes are reduced.

In accordance with the present invention, a fluid-tight quick-release joint is provided between the flanged ends of a pair of glass pipe sections by establishing a fast-reacting quick-release deforming pressure on an O-ring packing element located in grooves at the ends of the sections. A deforming pressure is established by a quick-release clamp that includes (1) a pair of annular support members having inside diameters larger than the sections but smaller than the flanges, (2) L-shaped rubber cushions attached to the support members in contact with the backsides of the flanges, and (3) a series of circumferentially spaced bolts that extend longitudinallly through openings in the support members and press the cushions to the flanges. As the bolts are tightened, the tendency of the support members to bend at the periphery of the flanges is restrained by the rubber cushions that increase the rigidity of the clamp. The transverse lip of the cushions also reduces the longitudinal component of force acting at the flange periphery and the longitudinal bending stress acting at the attaching surfaces of the flanges and pipes.

Easy assembly and dismantling of the joint is achieved by constructing the support members in approximate half sections in which the ends of the halves overlap and are joined by diametrically opposed bolts. Open ended slots are formed in one section so that pivoting the support members about the bolt located diametrically opposed to the slots breaks the clamp away from the pipes. To aid further in dismantling the joint, compression springs are located in contact with the support members. Each spring is supported by and concentric of a bolt and provides movement of the support members relative to the flanges as the bolts are loosened.

The present invention will become more apparent from the following detailed description of the invention taken in conjunction with the following drawings in which:

FIGURE 1 is a side elevational view of a pair of pipe sections sealed together in a fluid-tight seal by a clamp embodying the invention;

FIGURE 2 is an enlarged transverse section taken along line II—II of FIGURE 1 to illustrate the supports of the clamp;

FIGURE 3 is a longitudinal transverse section taken along line III—III of FIGURE 2 in which the packing element, the flanged ends, and the supports of the clamp are illustrated;

FIGURE 4 is a transverse sectional view of FIGURE 1 taken along line IV—IV in which segments of the supports of the clamp are folded away illustrating connection of the clamp to the flanged ends of the pipe; and FIGURE 5 is a side elevational view, partially cut away, of an alternative embodiment of the invention in which resilient bumpers are supported between the flanged ends and the support members of the clamp.

Referring to the drawings, particularly to FIGURES 1 and 3, a quick-release joint 2, constructed in accordance with the invention, used an O-ring packing element 3 to join flanged ends 8 and 9 of pipe sections 4 and 5 in a fluid-tight and/or vacuum-tight seal. To illustrate the fluid sealing aspects of the invention, the pipe sections 4 and 5 are shown conveying the fluid in the direction of arrows 6 and 7. This fluid may be a highly permeable gas such as hydrogen or a liquid having similar characteristics. The O-ring packer is of conventional design (circular cross section) and is seated in annular grooves 11 (FIGURE 3) formed in the flanged ends 8 and 9 of the pipes. These grooves lie adjacent coextensive alignment to form the O-ring capture chamber therebetween. The method of forming the glass type to provide flanged ends 8 and 9 and grooves 11 is taught in my copending application (Ser. No. 309,668, entitled "Flange Forming Fixture and Method," filed Sept. 8, 1963).

Using O-ring packers allows the joining of the pipe sections without using lubricants, but to economically form fluid-tight seals, it is important:

(1) That adequate sealing pressure be applied at all points about the packer, (2) That the clamp allow quick assembly and dismantling of the pipe joint, and (3) That the joint reduce the bending stress acting on the pipe as the clamp applies pressure at the packer.

Referring to FIGURES 1, 2 and 3 in accordance with the present invention, pressure of equal magnitude and direction is applied to O-ring packer 3 supported between flanged ends 8 and 9 of pipe sections 4 and 5 by a quick-release clamp comprising annular support members 13 and 14 positioned at the backsides of the flanged ends 8 and 9, resilient cushions 15 and 16 attached to the support members, and circumferentially spaced bolts 17a, 17b, 17c and 17d extending through openings 18 in support members.

To assure that the pressure is circumferentially applied, bolts 17a–17d squeezing the packer against annular grooves 11, are also circumferentially located about a circle whose axis lies on axis A. Since bending stress develops at the junction of flanged ends 8 and 9 and sides 21 of the pipes directly relative to the radius of the bolt circle, the bolts are positioned as close as possible to the pipes. The bolts are tensioned by means of wing unts 19 located at the back surfaces of support member 14. As the distance between the bolt heads and the wing nuts is reduced, the flanged ends of the pipes are drawn together to deform the packer.

Openings 18 are formed in the support members equidistant from axis A of the assembly and accommodate the bolts 17a–17d. The openings are of circular cross section with the exception of the openings that accommodate bolt 17a. As shown in FIGURE 4, the openings for bolt 17a are slotted, have arcuate side surfaces 28 and have radii centered at axis A.

Support members 13 and 14 are concentric with axis A of the assembly and have an inside diameter greater than that of the sides 21 of the pipes but less than that of the flanges. The mean diameter (D) of these members (FIGURE 1) is selected so that the clamp may be used to seal several sizes of pipe. This is achieved by selecting a flange mean diameter (d) that can be used with a given series of pipe sizes without forming bending stresses that will be beyond the yield point of the glass. Each support member is formed of pairs of crescent shaped segments 13a, 13b, 14a and 14b, respectively as shown in FIGURES 2 and 4. These segments have overlapping ends joined together by diametrically opposed bolts 17a and 17c. The bisegmented construction of the support members allows the clamp to open at the junctions 26 and 27 of the segments by releasing the pressure at bolt 17a and pivoting the segments about an axis passing through bolt 17c as shown in phantom line in FIGURE 4.

The arc length (S) of the overlap section of the segments (FIGURE 4) is bisected by a plane that passes through axis A and bolt 17a and bolt 17c and relates to diameter of the support member in accordance with $$S = D' \cos^{-1} \frac{C}{R'}$$

where: D' is the outside diameter of the support members, R' is the outside radius, and C is the cord connecting the central axis A with a cord describing the end points of the overlapped sections. In practice the arc length is approximately 1 inch for a support member of 3½ inches outside diameter.

To allow pressure on the flanges to emanate from a common plane normal to the axis of the assembly, the overlap sections of segments 13a and 14a are offset by steps 20 and 22 as shown in FIGURES 2 and 4. The height of each step is approximately equal to that of the thickness of the segments to align the members, with the exception of the overlap sections, along a common plane.

However, the pressure produced at the support members by tightening bolts 17a–17d is not transferred directly to the flanges. Resilient cushions 15 and 16, preferably rubber, have an annular configuration and attach to the support members to transfer the bolt pressure to the flanged ends. To assure that the bolt pressure is transferred to the flanges with minimum creation of bending stress, the transverse legs 23 of the cushions have a radial width dimension sufficient to position the end of the leg at least at a radius equal to that of the grooves 11 and 12 as shown in FIGURE 3. Longitudinal legs 24 of the cushions may be positioned at the periphery of the flanges as shown to increase the rigidity of the cushion relative to that of the support members. Thus as the members are drawn together, the natural tendency of the members to bend as the bolts are tightened and increase the pressure at the periphery (and hence the bending stress) is reduced by the increased longitudinal area of the cushions. Additionally leg 24 also prevents radial movement of the flanges as vibration of the pipes occurs because the junction of legs 23 and 24 is located at the corners of the flanges.

To allow the cushions to follow pivotal movement of the support member, each cushion is formed in two crescent shaped segments. The ends of the segments are located at points adjacent to the respective steps 20 and 22 of the overlap end portions of the support members. The segments attach to the support members by means of an adhesive.

In dismantling the joint, the clamp 10 is easily removed from contact with the flanged ends of the pipes with the aid of springs 25 sandwiched between the support members 13 and 14. Each spring is supported by a bolt prior to sealing the pipes and, as the bolts 17a–17d are tightened, is compressed. When the bolts are loosened, the compression force of the springs breaks any adhesive barriers developed at the surfaces of the cushion and flanges during the time the seal is formed. Dismantling is aided further by the split construction of the support members 13 and 14 and the cushions 15 and 16 previously mentioned. This type of construction allows the segments 13a and 14a to be pivoted about bolt 17c diametrically opposed to bolt 17a by merely releasing the bolt tension on bolt 17a. The slots in these segments release the clamp without the operator having to completely remove the wing nut attached to bolt 17a.

Referring now to FIGURE 5, an alternative form of the invention is illustrated for sealing flanges in which resilient bumper elements 30, preferably rubber having a circular cross section, (i.e., an O-ring configuration) are positioned at the backsides of flanged ends 8 and 9 to join pipe sections 4 and 5 in a fluid-tight and vacuum-tight seal. As distinguished from the embodiment shown in FIGURES 1–4, the bumper elements 30 are not attached to the support members but are held in contact with the flanged ends by friction supplied to the members by bolts 17a–17d. Prior to being squeezed by the support members, the bumpers are held in position opposite O-ring packer 3 by grooves 31 on the flanged ends of the pipes as shown; by detents on the support members, not shown; or by a hand tool having long fingers that are slipped between the flanged ends of the pipe and the support members, not shown. The bumpers are preferably the same diameter and shape as the O-ring packer 3 seated between the flanged ends of the pipe. A common size of O-ring thus can be stocked for use of both forming the seal as well as effectively distributing the sealing pressure over the pipes and results in a considerable saving of time and effort since hundreds of O-rings may be used in a single day to seal glass piping in the laboratory. But it should be noted that the shape of the bumpers can be changed to meet changing operating conditions. For example, if shearing of the flanged ends of the pipe is a serious problem, the cross section of the bumpers may be changed from circular to rectangular to increase the contact area between the bumpers and flanges, or to L-shaped to reduce the longitudinal component of force acting on the flanges in accordance with the cushions of FIGURES 1–4.

As the bolts 17a–17d are tensioned, pressure applied to the support members is transferred to the bumper elements causing their deformation into tight grippage with the grooves 31 in the flanged ends of the pipes. In turn, the pressure is transferred to the packer 3 as the flanged ends are moved toward one another, to seal the pipes in a fluid-tight seal. It should be noted that, although it is desirable that the packer 3 and bumpers 30 have identical shape and size, the bending stress at the junction of the flanged ends and sides 21 of the pipe, is directly related to radius of the bumpers 30. Thus, where the size of the pipes is small compared to the flanged ends, it may be necessary to use bumpers of smaller diameter than that of the packer.

In disassembling the joint, the clamp is aided in its removal from contact with the flanged ends by springs 25 sandwiched between the support members 13 and 14. Each spring is supported by a bolt prior to the time the bolts are tensioned. As the bolts are loosened to dismantle the joint each spring forces the support members to move away from each other so that adhesive barriers at the surface of the bumpers and the flanged ends are broken.

The split construction of the support members allows respective segments of the support members to be pivoted about bolt 17c to remove the clamp from contact with the flanges, as explained above. However, the bumpers are preferably a single piece construction for ease of interchangeability with O-ring packers 3 and are not permanently attached to the support members. The bumpers are inserted about and removed from the pipes by simply stretching them over the flanged ends of the pipes. This may be done whether the bumper has a circular, rectangular, or L-shaped cross section. Slots are formed in the segments of the members in the manner of FIGURE 4 to allow the clamp to be opened without necessity of the operator to completely remove the wing nut from bolt 17a.

While certain preferred embodiments of the invention have been specifically disclosed, it should be understood that the invention is not limited thereto, as many variations will be readily apparent to those skilled in the art. The invention is to be given as broad as possible an interpretation within the limits of the following claims:

I claim:

1. A joint for releasably joining glassware members in fluid-tight contact, comprising a pair of glassware sections having adjacent flanged ends, said flanged ends having interior adjacent faces provided with grooves, and outer faces remote from said interior faces, a gasket of resilient material confined in said grooves, a releasable clamp to releasably confine said gasket in said grooves under substantially uniform circumferential pressure, said clamp including a pair of support members axially spaced apart adjacent to said outer faces of said flanged ends, connecting means operatively engaged between said support members for axially urging said support members into contact with said outer faces of said flanged ends to confine said gasket, and a pair of resilient cushions coaxial of said gasket, each of which connecting between one of said pair of support members and said outer face of one of said flanged ends and having a mean diameter about equal to that of said gasket for distributing said axial urging pressure in circumferential alignment with said gasket whereby bending stresses near the attaching plane of said flanged ends of said glassware sections are reduced.

2. Said joint of claim 1 in which said outer faces of said flanged ends in contact with said cushions are substantially normal to the axis of symmetry of said glassware sections.

3. The joint of claim 2 in which said cushions contacting with said outer faces of said flanged ends of said glassware sections are annular and have circular cross sections.

4. The joint of claim 2 in which said cushions contacting said flanged ends of said glassware sections have rectangular cross sections.

5. Said joint of claim 2 including spring means for moving said support members in respective opposed directions as pressure is removed from said gasket to effect release of said cushions from said glassware sections, as said urging pressure is removed.

6. A joint for releasably joining glassware members in fluid-tight contact, comprising a pair of glassware sections having adjacent flanged ends, said flanged ends having interior adjacent faces provided with grooves, and outer faces remote from said interior faces substantially normal to the axis of symmetry of said sections, a gasket of resilient material confined in said grooves, a releasable clamp to releasably confine said gasket in said grooves under substantially uniform circumferential pressure, said clamp including a pair of support members axially spaced apart adjacent to said outer faces of said flanged ends, each of said support members formed of at least two crescent-shaped segments having at least first and second overlapping end sections with openings therethrough, a series of nut-and-bolt assemblies operatively engaged through said openings capable of axially urging said support members into contact with said outer faces of said flanged ends to confine said gasket, a pair of resilient cushions coaxial of said gasket, each of which permanently attaching to one of said pair of support members adjacent to said outer face of one of said flanged ends and comprising at least a pair of crescent-shaped elements having common centers of formation defining a mean diameter about equal to that of said gasket for distributing said urging pressure in circumferential alignment with said gasket whereby bending stresses at the attaching plane of said flanged ends of said glassware sections are reduced.

7. Said joint of claim 6 in which selected openings through said overlapping end sections of each support member are slotted to permit, as confining pressure is removed, simultaneous radial disengagement of said pair of support members and said cushions relative to said glassware sections.

References Cited

UNITED STATES PATENTS

| 1,309,146 | 7/1919 | Mann | 285—368 |
| 1,351,573 | 8/1920 | Hopwood | 285—336 X |
| 2,101,894 | 12/1937 | Broughton | 285—337 X |

FOREIGN PATENTS

| 567,948 | 10/1958 | Belgium. |
| 913,374 | 6/1954 | Germany. |
| 917,219 | 8/1954 | Germany. |
| 773,541 | 4/1957 | Great Britain. |
| 798,305 | 7/1958 | Great Britain. |
| 580,911 | 8/1958 | Italy. |

CARL W. TOMLIN, *Primary Examiner.*

D. W. AROLA, *Assistant Examiner.*